US010813487B2

(12) United States Patent
Ceriani et al.

(10) Patent No.: US 10,813,487 B2
(45) Date of Patent: Oct. 27, 2020

(54) PROCESS AND APPARATUS FOR PREPARING AND DISPENSING COFFEE (71) Applicant: RHEAVENDORS SERVICES S.p.A, Como (IT)

(72) Inventors: Ezio Ceriani, Como (IT); Carlo Doglioni Majer, Como (IT); Luca Doglioni Majer, Como (IT); Aldo Doglioni Majer, Como (IT)

(73) Assignee: RHEAVENDORS SERVICES S.p.A, Como (IT)

( * ) Notice: Subject to any disclaimer, the term of this patent is extended or adjusted under 35 U.S.C. 154(b) by 313 days.

(21) Appl. No.: 15/854,035

(22) Filed: Dec. 26, 2017

(65) Prior Publication Data

US 2018/0116443 A1   May 3, 2018

Related U.S. Application Data (62) Division of application No. 14/908,364, filed as application No. PCT/IB2014/001396 on Jul. 25, 2014, now Pat. No. 10,130,207.

(30) Foreign Application Priority Data

Jul. 31, 2013   (EP) .................................... 13178835

(51) Int. Cl.
  *A23F 5/24*       (2006.01)
  *A47J 31/36*      (2006.01)
  *A23F 5/26*       (2006.01)
  *A47J 31/06*      (2006.01)

(52) U.S. Cl.
  CPC ............. *A47J 31/3614* (2013.01); *A23F 5/24* (2013.01); *A23F 5/262* (2013.01); *A47J 31/3609* (2013.01); *A47J 31/0663* (2013.01)

(58) Field of Classification Search
  CPC ................ A47J 31/0647; A47J 31/0663; A47J 31/3609; A47J 31/3614; A23F 5/24; A23F 5/243; A23F 5/262
  USPC .... 99/284, 289 R, 302 P; 426/433, 434, 435
  See application file for complete search history.

(56) References Cited

U.S. PATENT DOCUMENTS

| 4,970,948 | A | * | 11/1990 | Giannelli | A47J 31/002 99/280 |
| 5,316,781 | A | | 5/1994 | Lussi et al. | |
| 2005/0066820 | A1 | | 3/2005 | Lussi | |
| 2008/0050480 | A1 | * | 2/2008 | Doglioni Majer | A47J 31/52 426/231 |

(Continued)

FOREIGN PATENT DOCUMENTS

EP        0 528 757 A1    2/1993

OTHER PUBLICATIONS

European Search Report for EP 13 17 8835 dated Dec. 3, 2013.
(Continued)

*Primary Examiner* — Reginald Alexander
(74) *Attorney, Agent, or Firm* — Sughrue Mion, PLLC (57) ABSTRACT A process for preparing coffee in a dispensing apparatus is described, the apparatus (1) having a feed chute (6) mounted on the supporting frame (2) and being able to rotate with respect to said frame in order to feed the ground coffee to the infusion chamber (3), wherein the feed chute (6) and the infusion chamber (3) are positioned so as to obtain a desired distribution of ground coffee in the chamber (3).

7 Claims, 11 Drawing Sheets (56) References Cited

U.S. PATENT DOCUMENTS

2011/0011272 A1    1/2011   Lussi
2014/0150664 A1*   6/2014   Corti .................. A47J 31/0647
                                                         99/283

OTHER PUBLICATIONS

International Preliminary Report on Patentability, dated Feb. 11, 2016, from the International Bureau in counterpart International application No. PCT/IB2014/001396.
International Search Report for PCT/IB2014/001396 dated Oct. 13, 2014.

* cited by examiner

PROCESS AND APPARATUS FOR PREPARING AND DISPENSING COFFEE

CROSS REFERENCE TO RELATED APPLICATIONS

This application is a divisional of U.S. application Ser. No. 14/908,364 filed Jan. 28, 2016, which is a National Stage of International Application No. PCT/IB2014/001396 filed Jul. 25, 2014, claiming priority based on European Patent Application No. 13 178835.8 filed Jul. 31, 2013, the contents of all of which are incorporated herein by reference in their entirety.

FIELD OF THE INVENTION

The present invention concerns a process for preparing various types of coffee in a dispensing apparatus and a dispensing apparatus adapted for carrying out such a process.

BACKGROUND OF THE INVENTION

For sake of description simplicity, it is herein referred to coffee only, but more in general the present invention refers to any beverage obtained by infusion of a substance in form of powder or particles, such as tea, tisanes and similar, with water or other infusion liquid.

Machines for dispensing beverages are known, in particular for coffee and beverages of the same kind, having a dispensing apparatus for preparing coffee, where ground coffee is measured and inserted, by gravity, into an infusion chamber and then compressed by one or more movable walls, usually one or more pistons. An infusion liquid, usually water, is then forced through the coffee tablet compressed into the infusion chamber, so that the substances of the ground product are extracted and the beverage is obtained.

The amount of coffee powder to be settled inside the infusion chamber depends on the type of desired beverage: for example, for an espresso is necessary an amount of ground coffee much lower than the coffee amount necessary for a so-called "American" coffee. The ground coffee is fed by gravity into the infusion chamber and tends to settle inside the chamber randomly: in case of small coffee amount, little chambers have to be adopted in order to obtain beverages having acceptable qualities. Thereby there are dispensing machines having two infusion chambers, to be used based on the coffee amount to be dispensed into the infusion chamber: one with greater dimensions for greater amounts of coffee and one with smaller dimensions for beverages needing less coffee powder in the chamber, such as for example the "ristretto" and "espresso" coffee.

However such a solution is expensive to manufacture and needs an additional space in the dispensing machine. Furthermore, the presence of two infusion chambers increases the maintenance machine costs considerably.

Additional known problems of the dispensing assemblies refer to the repeatability of the beverage quality for all extractions.

In particular, during the "moistening" (or pre-infusion") step, preferential paths originate inside the coffee tablet, along which the infusion liquid can pass through the tablet more easily, with a consequent non-optimal moistening of the coffee and a compromised extraction of substances from the ground coffee.

Furthermore it has to be considered that some machines provide for changes of their operative parameters based on the pressure detected on the piston that presses the coffee powder. Then a non-homogeneous distribution of the coffee powder inside the infusion chamber or frictions coming from movements can provide an inaccurate reading of pressure exercised during the coffee pressing.

Additional drawbacks caused by a non-homogeneous distribution of coffee powder can further be a greater wear of piston which compresses the coffee powder, with a consequent friction increase that could lead not only to a wrong reading of the forming pressure of the tablet, but also to damages of the piston itself.

SUMMARY OF THE INVENTION

Object of the present invention is to solve the above mentioned problems and to provide a process and an extracting apparatus for preparing coffees which allow to obtain an infusion with optimal and repeatable quality of the prepared beverage, independently from the amount of coffee powder fed to the infusion chamber. In particular, it is an object of the invention to provide an apparatus wherein an infusion chamber could serve for preparing beverages with very different volumes, also of one order of magnitude, such as for example 25 cc of a "ristretto" versus more than 230 cc or 12 fluid ounces (about 350 cc) of an American coffee.

These and other objects are obtained by the present invention concerning a process for preparing coffees according to claim 1. More in particular, the process according to the invention provides for the use of a dispensing apparatus having a supporting frame, a cylindrical infusion chamber, with a preferably vertical axis, mounted on the supporting frame and able to translate with respect to the frame along a direction parallel to the axis of the infusion chamber, and a feed chute mounted on the supporting frame. The feed chute can be rotated with respect to the frame in order to feed the ground coffee to the infusion chamber and it is arranged above the infusion chamber, during at least part of the preparing steps of the beverage. The process comprises, in a known way, the steps of:

a) preparing, and feeding into the infusion chamber through the feed chute, a measure of ground coffee based on the dispensation selection made by a user; b) compressing the coffee measure inside the infusion chamber; and c) feeding the heated water into the infusion chamber to prepare and dispense the coffee.

In particular, before and/or during the step a), the movable infusion chamber and/or the feed chute are arranged, one with respect to another, as a function of the amount of ground coffee of the measure to be accommodated inside the infusion chamber. More in detail, the process of the invention is characterized by the steps of identifying the beverage type selected by the user, determining the positions of said chamber, of the piston movable along with the chamber and of the feed chute, checking whether the positions correspond to those stored in a memory device of the apparatus as positions associated with the beverage to be dispensed; in case, changing the position of the chamber up it reaches the corresponding stored position for the selected beverage; feeding the requested amount of ground coffee or other ingredient and dispensing the beverage selected by the user. As better disclosed hereinafter, the chamber position is directly associated with the angular position of the chute, whereby in the process herein described it is sufficient to detect the position of the infusion chamber to be able to determine the chute position too. Furthermore, the position of the lower piston can be obtained from the position of the infusion chamber and the progress level of the process, i.e. from the knowledge of which have been the process steps made before.

For the purposes of the present invention, with the term "determining the position of the lower piston" is intended the possibility—in relation to a certain component—of directly or indirectly determining the position in which said component is, that is for example by monitoring the electric movement of a second component mechanically connected to the first one.

Object of the present invention is also an apparatus for preparing and dispensing coffee, comprising: a supporting frame, a cylindrical infusion chamber, with a substantially vertical axis, i.e. vertical or slightly tilted with an angle smaller than 10 degrees, preferably smaller than 5 degrees and more preferably smaller than 3 degrees with respect to the vertical; the infusion chamber is mounted on the supporting frame and is able to move in translation with respect to said frame along a direction parallel to the axis of the infusion chamber; a feed chute mounted on the supporting frame, arranged above the infusion chamber and able to rotate with respect to the frame itself to feed the ground coffee to the infusion chamber.

The apparatus for preparing and dispensing coffee comprises means for arranging the movable infusion chamber, the lower piston and/or the feed chute, one with respect to another, as a function of the amount of ground coffee of the measure to be accommodated inside the infusion chamber, in order to have a material distribution as uniform as possible before the material is compacted in the step preceding the infusion.

According to the invention, the movable infusion chamber has a piston forming a bottom wall in the chamber; if necessary, in turn the piston is movable in the chamber to change the volume of the chamber itself. Preferably, for each dispensation, the distance of the bottom wall of the infusion chamber from the upper edge of the latter is set up also as a function of the amount of ground coffee of the measure to be accommodated inside the chamber.

According to a further aspect of the present invention, the feed chute can be freely rotated with respect to an axis perpendicular to the translation axis of the infusion chamber, and the chute positioning is adjusted by means of respective cam surfaces associated with the infusion chamber and the chute itself.

More in detail, the process provides for the movement of the chamber, its piston and chute, from a generic starting position (expressed by the coordinates h1, h2 and $\alpha$, where h1 is the chamber distance from the upper base of the frame, h2 is the distance of the lower piston from the upper edge of the infusion chamber and $\alpha$ is the tilt angle of the chute) and at least one final position, with which a uniform distribution of coffee in the chamber is obtained. Said at least one final position (expressed by the coordinates h1, h2 and $\alpha$ too) is stored in a control unit in the form of a "map" experimentally obtained before; in the map, final positions (the coordinates h1, h2 and $\alpha$ of the positions that the chamber, its piston and chute must reach) are stored, associated with a series of predetermined coffee amounts generally corresponding to the necessary amount for one or more beverages. Such values are stored in a memory device readable by a control unit.

In other words, the process provides for the experimental determination of which are the positions of the infusion chamber, its lower piston and chute (expressed as coordinates h1, h2 and $\alpha$) leading to a better distribution of the coffee layer in the infusion chamber, i.e. a distribution as uniform as possible. It has been verified that a uniform distribution corresponds to a better beverage dispensation from a known and predetermined amount of ground coffee. Positions expressed as coordinates are stored in a memory device as coordinates associated with said amount of ground coffee.

When a beverage is being dispensed, the control unit changes the h1, h2 and $\alpha$ values from the current values, e.g. of the standby position, to the values stored as adapted for the beverage to be dispensed; then the chamber, the lower piston and the chute are moved to the position h1, h2 and $\alpha$ found in the memory and associated with the beverage type the user requested; the ground coffee is fed into the chamber in the suggested position and then the former is compressed to a tablet shape before the generally hot water infusion.

Thanks to this solution, the pressing the ground coffee is subjected to before the infusion, allows to always obtain a tablet with a substantially uniform density, that is as uniform as possible, inside the infusion chamber.

By means of experimental tests it has been found that, in order to obtain a proper pressing, it is sufficient that the cone of powder coffee settled in an infusion chamber reaches a maximum height, from the base of the infusion chamber, at the center of said base; so during the pressing, grains of ground coffee are distributed inside the infusion chamber, with a substantially uniform density.

Coordinates h1, h2 and $\alpha$, corresponding to position in which an amount x of ground coffee with grain size z has been detected, such an amount being necessary for preparing a beverage y, once that amount is fed to the infusion chamber becoming a cone with top on the chamber axis or next to the chamber axis, are then stored in the memory device as associated with the requested beverage.

The same is done for other beverages the apparatus has to dispense, thereby forming a map of possible solutions. The experimentally obtained data can then be processed to give a function or algorithm allowing to obtain various types of coordinates h1, h2 and $\alpha$, starting from ground matter amount and grain size thereof.

When operating, once the volume of the infusion chamber has been set up, during the settlement of the ground coffee, the chamber itself and/or the feed chute are arranged in one or more positions stored in the map so that, at the end of the arrangement, the settled coffee powder would reach a maximum height of the settlement cone, substantially at the center of the infusion chamber, and this happens for every amount provided for the measure determined by the selection the user did.

According to the present invention, the movable infusion chamber has at least one lower piston wall for changing its volume and set it up, before every dispensation, as a function of the amount of ground coffee of the measure to be housed inside it.

According to a further aspect of the present invention, the feed chute is freely rotated with respect to an axis perpendicular to the translation axis of the infusion chamber (and not necessarily intersecting the same), and the cam surfaces associated with the feed chute and the infusion chamber allow to mutually position them.

Object of the present invention is also a computer program comprising codes executable by a computer in order to optimize the distribution of coffee powder or other material in an infusion chamber of an apparatus for preparing and dispensing coffee or other beverage according to the present invention.

The program is stored in a memory device and is executed by a control unit of the apparatus for preparing and dispensing beverages according to the present invention; said program comprises: codes executable by a computer for determining the positions h1, h2 and α of the infusion chamber, the lower piston and the chute; codes executable by a computer for checking whether said determined positions h1, h2 and α correspond to positions stored in a map in the memory unit, adapted for the beverage to be dispensed; codes executable by a computer for changing, in case, the positions h1, h2 and α of the infusion chamber, the lower piston and the chute up they reach the corresponding stored positions.

According to an aspect of the present invention, a code determines directly and/or indirectly the coordinates h1, h2 and α by means of at least one position sensor; a code compares the values of such coordinates with the values of the coordinates stored in a map in the memory unit; in case in which the stored coordinates and the determined coordinates are different, an additional code changes the positions h1, h2 and α by driving the motor means.

According to an additional aspect of the present invention, coordinates h1, h2 and α optimizing the distribution of coffee powder for every beverage dispensable by the apparatus for preparing and dispensing beverages according to the present invention and as discussed before, are stored in the map, such coordinates stored in the map having been previously obtained by means of experimental tests.

BRIEF DESCRIPTION OF THE DRAWINGS

Further aspects and objects of the present invention will become more evident from the description below, made for illustrative and not limitative purposes, with reference to the accompanying schematic drawings, in which.

MODES FOR CARRYING OUT THE INVENTION

Figure 1:
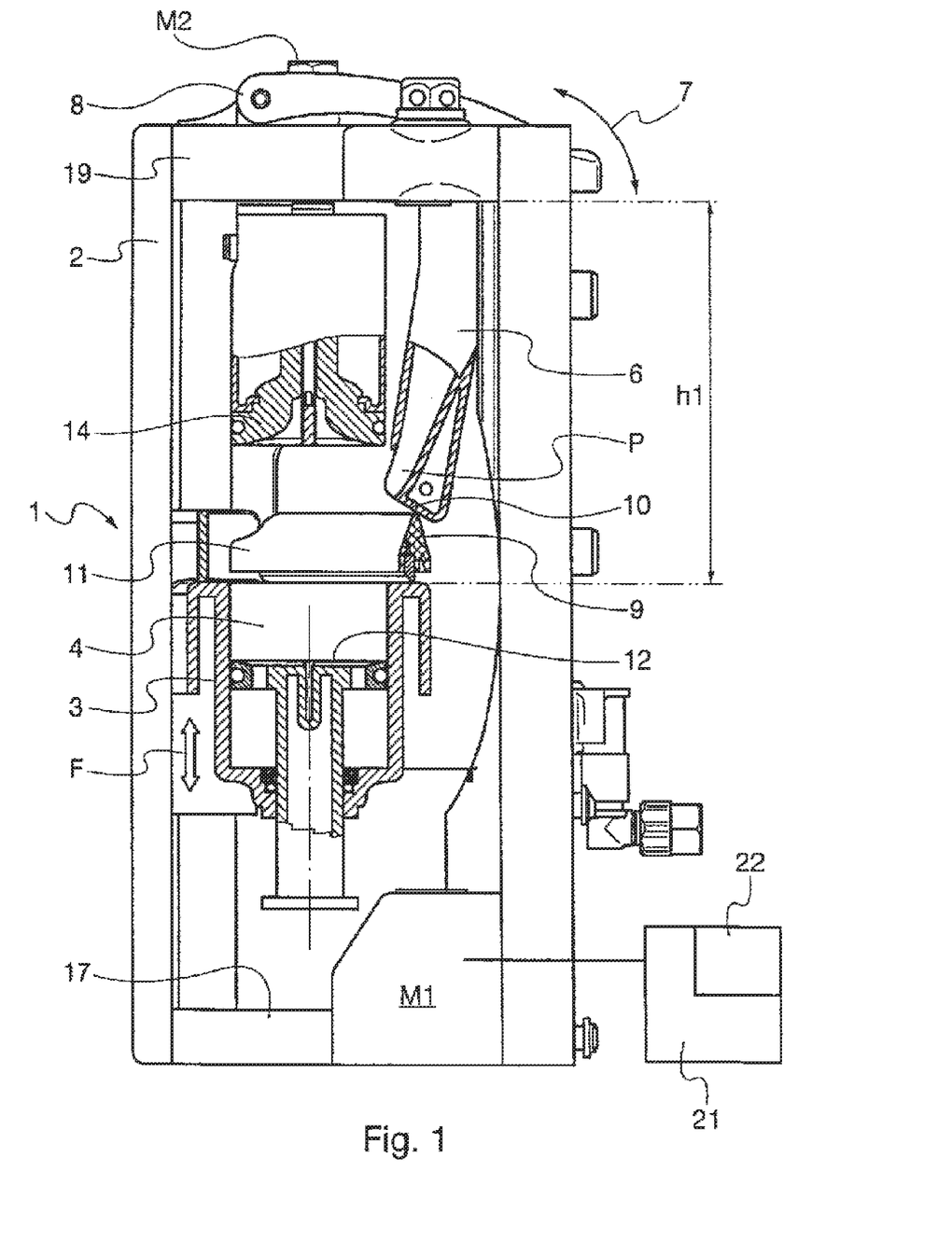
FIG. 1 is a front partial section view of an apparatus for preparing and dispensing coffee.

Referring to FIG. 1, an apparatus 1 for preparing and dispensing coffee has a supporting frame 2 to which means necessary for preparing a beverage are constrained. In particular an infusion chamber 3, having a cylindrical shape with vertical or substantially vertical axis 4 (i.e. tilted with respect to the vertical of an angle lower than 10 degrees, preferably lower than 5 degrees and more preferably lower than 3 degrees from the vertical) are shown, the chamber 3 being mounted on the supporting frame 2. In particular the infusion chamber 3 can move in translation with respect to the frame 2 along the direction of the axis of the infusion chamber 3, as shown by an arrow F in FIG. 1. Inside the chamber 3 there is a piston 12, in a known way, forming a movable bottom wall.

The apparatus 1 has further a feed chute 6 mounted on the supporting frame 2 to feed the ground coffee to the infusion chamber. The feed chute 6 is arranged above the infusion chamber 3, being able to rotate with respect to a pivot 8 constrained to the same frame 2, as indicated by the arrow 7 in FIG. 1.

The apparatus 1 further comprises a higher piston 14 for compressing the coffee tablet 13; in the shown embodiment, said piston 14 is fixed, but additional embodiments in which the piston 14 is axially movable can be provided.

The apparatus 1 further comprises means for arranging the movable infusion chamber 3 and/or the feed chute 6 one with respect to another in such a position that the ground coffee coming out from the chute will settle on the bottom wall 12 of the infusion chamber 3 with a determined distribution.

According to the invention, exemplified in the preferred embodiment shown in the figures, the infusion chamber 3 is mounted in a known way on an operating worm 5 driven by motor means M1, which are schematically shown in FIG. 1 and cause the rotation of the worm 5 and the consequent vertical translation of the chamber along the axis 4. In the shown embodiment, the translation direction of the infusion chamber 3 is parallel to the axis 4 of the infusion chamber 3 itself. Motor means M1 are able to accurately carry out little displacements of the infusion chamber 3 where, with the term little, movements of about a tenth of millimeter is intended. For example motor means M1 can comprise a stepper motor acting on the operating worm 5 coupled to a nut screw or similar means, integral with the chamber 3.

As mentioned above, the feed chute 6 can be rotated with respect to the axis of the pivot 8, which is preferably mounted perpendicularly to the translation axis of the infusion chamber, but preferably not intersecting therewith. The chute 6 is mounted symmetrical to the rotation pivot 8, so that it is usually urged by its own weight to rotate towards the upper piston 14; as shown in FIG. 1, the chute 6 is arranged on a side of the second cylinder, and it extends through the upper portion 19 of the frame up to an arm 6' that, in its turn, extends up to the mounting point composed of a pivot 8 at the opposite side with respect to the axis 4.

The chute 6 comprises a drop or slip plane P intercepting the axis 4 with an angle α (upper angle); supposing a as a constant, based on the position of the chamber 3 and the lower piston 12, the plane P intercepts the wall inside the chamber or piston 12 in different possible positions. Plane P is defined by the last chute portion or, if such a portion is curved, the plane is that extending between the initial and final parts of said curved portion.

For practical purposes, the plane P is assumed as corresponding to the ideal slip direction of the coffee powder, the direction being represented by the straight line tangent to the path of the parabolic motion (under the gravity action) of the coffee powder in the ending chute point.

Figure 3:
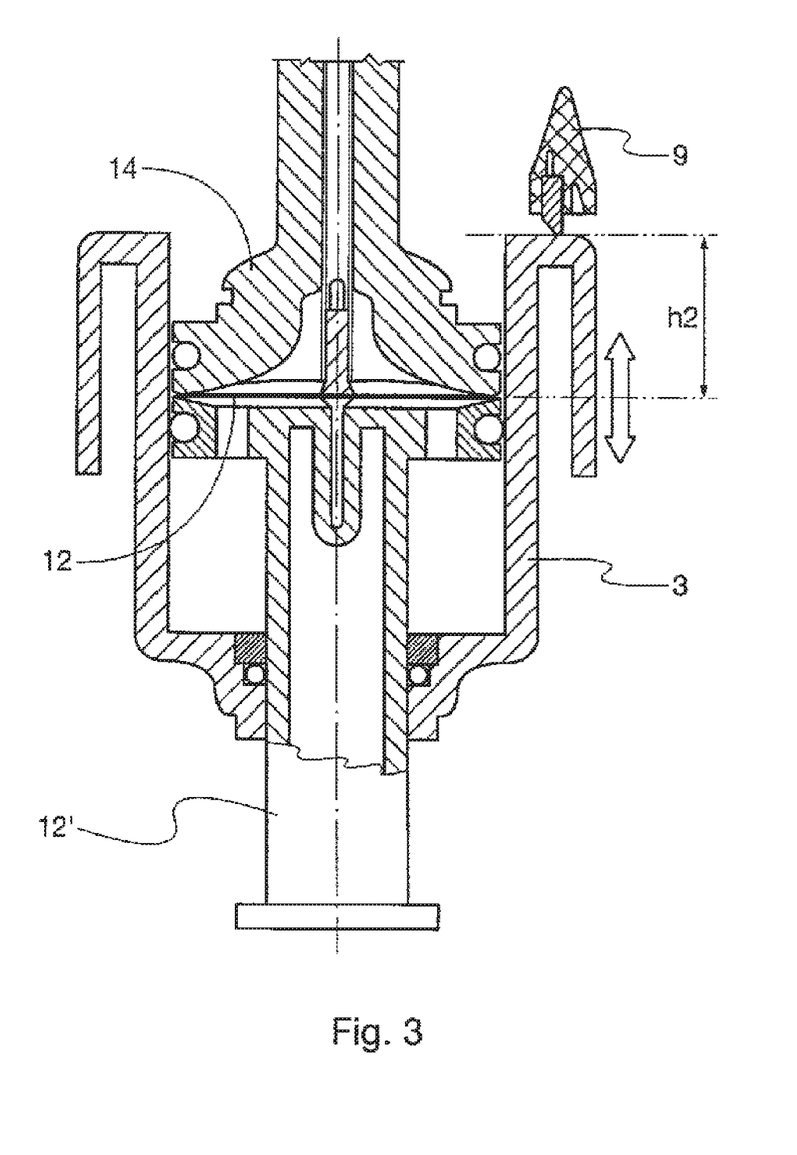

The position of the infusion chamber is defined by the distance h1 (FIG. 1) between the lower side of the upper base 19 of the frame 2 and the upper edge 15 of the infusion chamber 3. The position of the lower piston 12 is defined by the distance h2 (FIG. 3) between said piston 12 and the upper edge 15 of the infusion chamber 3. The three height and tilt values h1, h2 and α are the coordinates identifying the position of chamber, piston and chute and the possible path of the ground coffee.

All three afore described values, i.e. α, h1 and h2, can be changed to adjust the ideal interception point of the plane P with the infusion chamber so that to obtain a regular distribution of coffee inside the chamber itself. Such an ideal distribution is as uniform as possible, so that to obtain a tablet thickness, after the compression, that is as uniform as possible too. An ideal shape of uniform distribution is that in which the highest point (top) of the cone, made of coffee fed into the chamber, lies on the axis 4 or immediately adjacent thereto. Alternatively two or more cone tops are possible, equal one to another and spaced out from the chamber; these can be obtained by changing the coordinates h1, h2 and α during the dispensation of ground coffee. According to the present invention, the adjustment of coordinates h1, h2 and α is made by an open loop control; the h1, h2 and α values leading to an uniform coffee distribution in the chamber, are obtained by experimental tests and stored in a map; the stored h1, h2 and α values are experimentally obtained for a series of specified coffee amounts generally corresponding to the amount necessary for at least one specified beverage. In other words, a certain number a determined coffee amounts are selected, e.g. equal to 4.0 g, 8.0 g, 11.0 g and 14.0 g, corresponding to as many beverages (strong, espresso, weak, American coffee), the coordinates h1, h2 and α are experimentally obtained leading to an optimal distribution of powdered coffee and such coordinates are stored in a map of a control unit in combination with respective beverages and amounts of coffee to be delivered Every map stored in the control unit is anyway referred to a particular grinding coffee degree and/or a particular coffee body; in general the control unit stores at least one map in which coordinates h1, h2 and α to be reached by the infusion apparatus during the whole preparing cycle of one or more beverages are stored.

As the beverage is dispensed, for example a weak coffee, the control unit 21 monitors the coordinates h1, a and h2 of the chamber, chute and piston by their determination in a known way (for example by means of position sensors, encoders on the worm 5 or similar devices); then the control unit drives the motor means M1, by a closed loop control, to displace the infusion apparatus from a general initial position to a determined position having the coordinates h1, h2 and α stored as adapted for the beverage to be dispensed; the ground coffee is then fed to the infusion chamber; the control unit can have in memory additional positions and then additional coordinates h1, h2 and α the infusion apparatus must reach during the feed step; subsequently the powdered coffee is compressed to a tablet before the generally hot water infusion.

The same operations are repeated for the next beverage.

In the preferred embodiment shown in the figures, α, h1 and h2 values can be changed by the chamber translation; directly regarding to h1 and indirectly regarding to h2 and α.

Regarding to the change of α angle, the invention provides that the lower edge of the chute is shaped so that it can be rotated by the push of the translating chamber 3; for this purpose chute and chamber have preferably cam means. More in detail, the chamber 3 has on top and in a known way, ejecting means 11, for example rotatable around an axis parallel to axis 4, to remove the tablet of exhausted coffee when the dispensation is ended. Cam surfaces 9, 10 are respectively provided on ejecting means 11 associated with the infusion chamber 3 and on the feed chute 6, so that their engagement will cause a displacement of the feed chute 6 with respect to the infusion chamber 3 and then a change of the α angle.

Figure 4A:
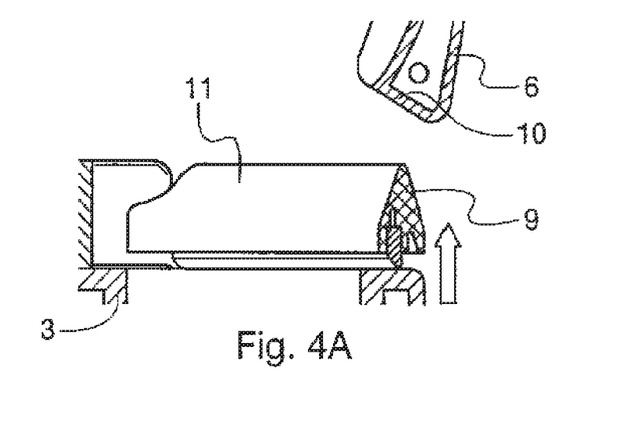
FIGS. 4A, 4B and 4C represent some steps of the chute tilt adjustment by means of the infusion chamber in the invention process.
Figure 4B:
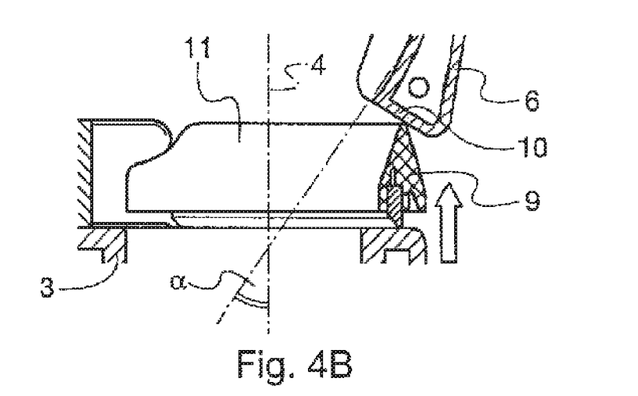
Figure 4C:
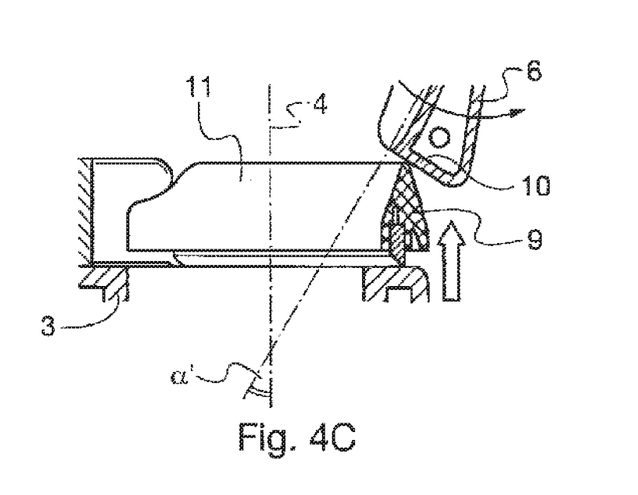

As can be seen in FIG. 4A-4C, referring to the shown embodiment, a raising of the infusion chamber 3, then a decrease of the distance h1, causes the engagement of the cam surface 9 with the cam surface 10 of the feed chute 6, and a consequent anticlockwise rotation of the feed chute 6 around the pivot 8 and a decrease of the α angle. On the contrary, a lowering of the infusion chamber 3, then an increase of the distance h1, causes a clockwise rotation of the feed chute 6 and then an increase of the α angle. A further lowering of the infusion chamber 3 causes the disengagement of the cam surfaces 9 and 10, so that to decouple the movement of the feed chute 6 from the movement of the infusion chamber 3 itself and to be able to freely position the latter with respect to the former. It is evident than different positions of the cam surfaces 9 are possible, as long as able to cooperate with the cam surface 10 of the feed chute 6.

In the description herein represented cam means 9, 10 have been described for the handling of the feed chute 6, freely to rotate, through the movement of the chamber 3, but different handling means can be adopted, for example motorized handling means known in the art for their controlled positioning of the feed chute with respect to the infusion chamber.

According to a peculiar aspect of the invention, the infusion chamber 3 has a lower piston forming at least one movable bottom wall 12, from now on simply lower piston 12, that allows to change the volume of the chamber 3. The lower piston 12 is integral with a column, or stem, 12' protruding from the lower part of the chamber 3. As afore mentioned, the position of the lower piston 12 can be defined by the distance h2 between said lower piston 12 and the upper edge 15 of the infusion chamber 3.

In the preferred shown embodiment, the position h2 of the piston is adjusted by the translation of the infusion chamber; in other embodiments motorized means for adjusting the h2 value can be present.

Figure 9:
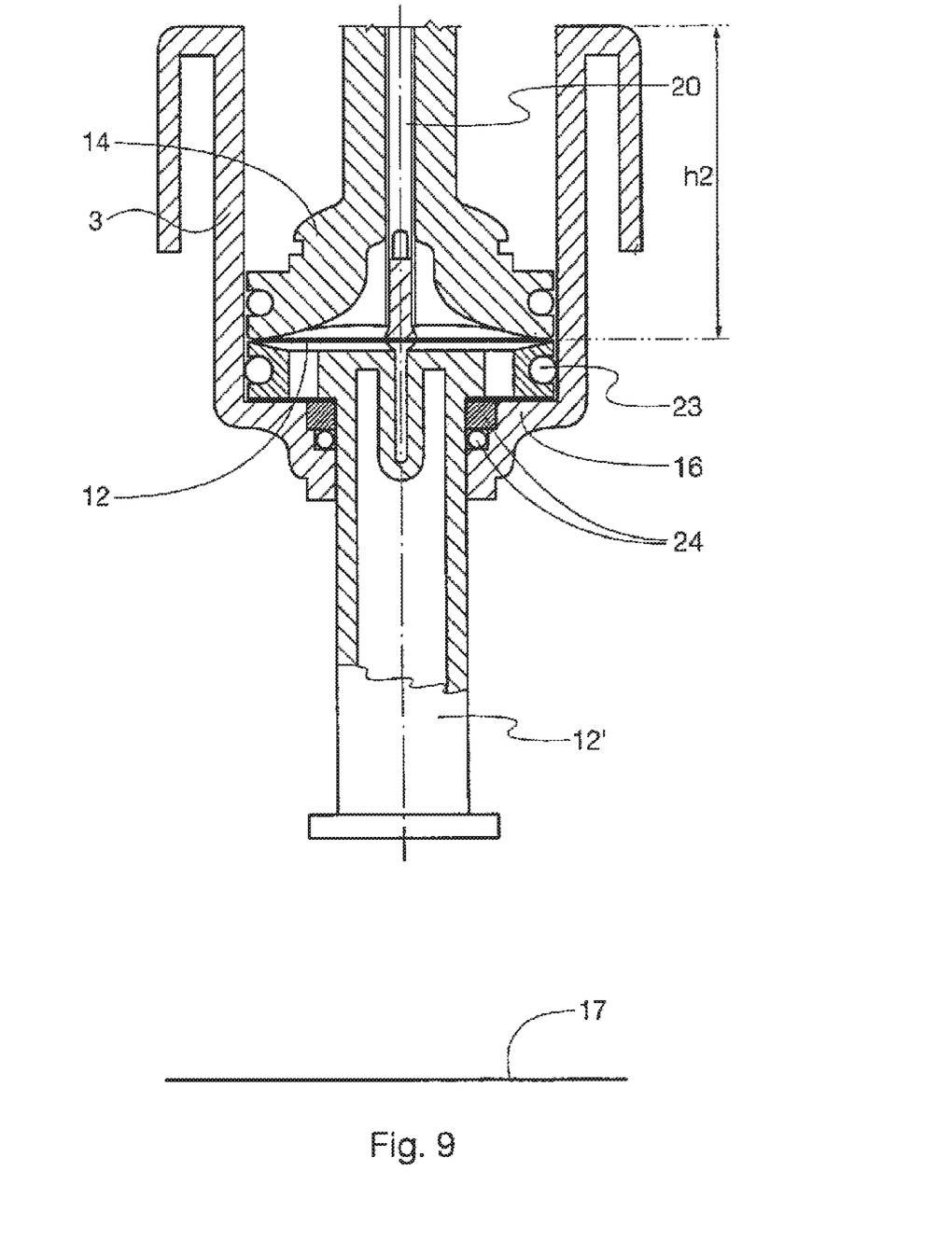

For example, starting from an initial position shown in FIG. 9, in which the chamber is completely raised and the lower piston 12 is completely lowered into the chamber 3, h2 is equal to its maximum value; in order to decrease the distance h2, i.e. to displace the lower piston 12 towards the upper edge 15 of the infusion chamber 3, the infusion chamber is translated downwards until the column 12', by abutting against the lower base 17 of the frame 2, will hold the lower piston 12 in a fixed position and the descending infusion chamber 3 will reduce the distance h2 to the desired one, e.g. half of distances in FIG. 9.

When the infusion chamber is translated upwards, the lower piston stays on the previously assumed position by friction means 23 and 24, for example gaskets, that prevent said lower piston from freely slide inside the infusion chamber; said friction means can be, for example, O-rings.

Figure 2:
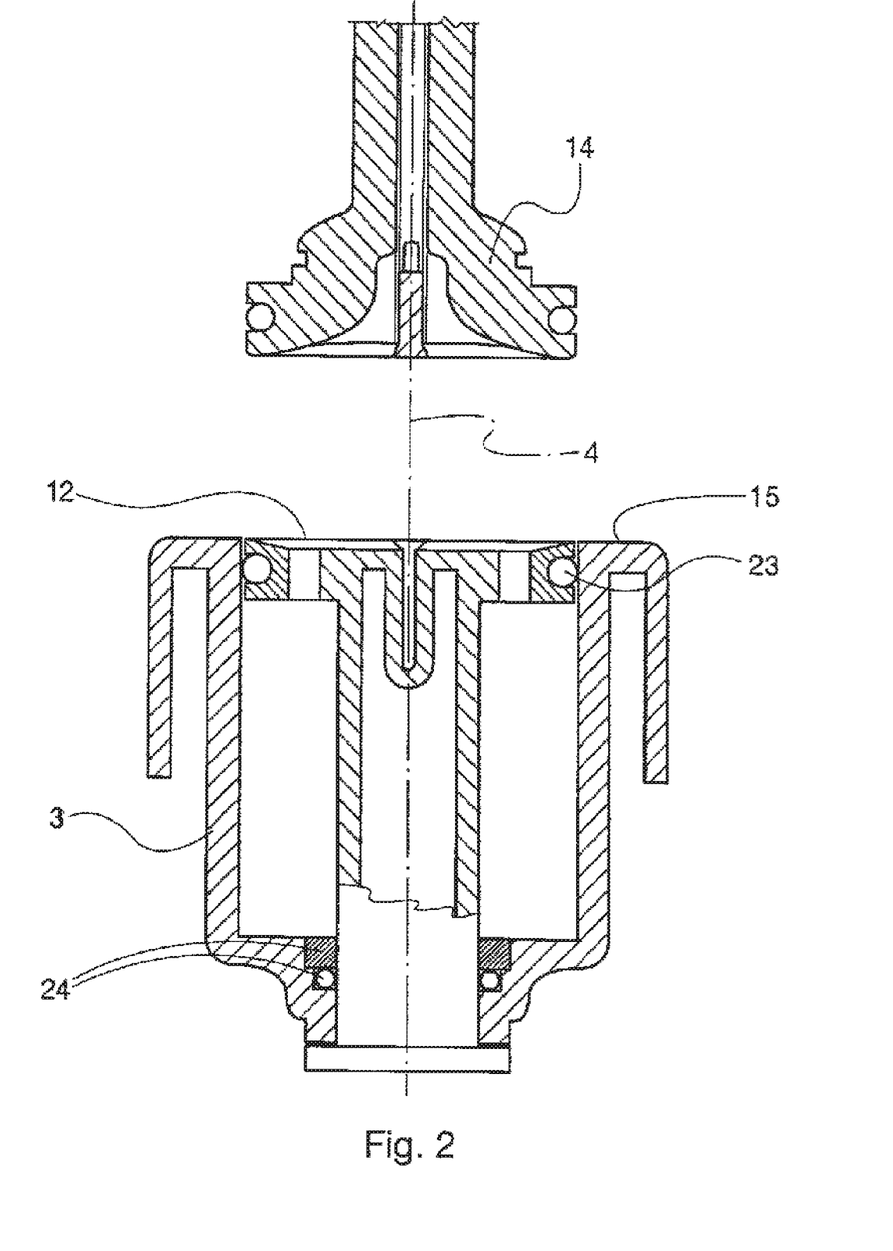
FIGS. 2, 3 and 9 show the arrangement of chamber and pistons, in a cross section, in two steps of the invention process.

FIG. 2 shows the position in which h2 is equal to 0, because both chamber 3 and piston 12 have been displaced to their maximum lower position, in abutment against the lower frame base. Starting from the initial position shown in FIG. 2, in which the lower piston 12 is flush with the upper edge 15 of the chamber 3 and h2 is equal to zero (its minimum value); in order to increase the h2 distance, the infusion chamber 3 is translated upwards so that the lower piston 12, by abutting against the upper piston 14, is stopped and held in a fixed position, whereas the ascending infusion chamber 3 will increase the h2 distance.

Additional embodiments are anyway provided, in which the position of the lower piston 12, i.e. the distance h2, can be adjusted by handling said lower piston by dedicated motorized means known in the art.

The control unit 21 determines the positions of the chamber 3, lower piston 12 and chute 6 through at least one of the values of coordinates h1, h2 and α; for the purposes of the present invention, the h2 position of the lower piston 12 is determined by drawing it from the coordinate h1 relative to the position the infusion chamber takes during the operating cycle. In other words, starting from an initial referring position h1 in which, e.g., the infusion camber is completely lowered (compare position A of FIG. 10), such a starting coordinate h1 corresponds to a h2 coordinate equal to zero as the lower piston 12 is flush with the upper edge 15 of the chamber 3; then, starting from this cycle step, it is possible to translate the infusion chamber to a final height h1, so that the lower piston 12, by abutting against the upper piston 14, will reach the desired height h2 thereby determining h2 from the detected height h1.

Similarly, starting from a referring position h1 in which, e.g., the infusion camber 3 is completely raised (see FIG. 9), in such a cycle step the starting coordinate h1 corresponds to a known coordinate h2 equal to its maximum value, as the lower piston 12 is completely lowered inside the chamber 3; then, starting from this cycle step, it is possible to successively translate the infusion chamber to a final height h1, so that the column 12' of the lower piston 12 abuts against the lower base 17 of the frame 2 and the lower piston 12 reaches the desired height h2 thereby determining h2 from the detected height h1.

It has to be noted that the h2 value can also be determined by detecting the position of a point of the column 12', for example the end, and the position of the chamber 3, i.e. h1. Knowing how much is the distance between the end of 12' and the end of the piston 12 it is possible to determine the h2 value.

Alternatively, the h2 position of the lower piston can be adjusted, with respect to the infusion chamber, by dedicated motorized means of a type known in the art and, in this last case, h2 can be detected by position sensors known in the art coupled with such motorized means.

As described before, in the preferred embodiment shown in figures, also angle α is set up as a function of h1; this allows to obtain a change in the intersection point between the plane P and the inner wall of the chamber or piston 12 greater than an embodiment in which the angle α is adjusted by leaving h1 constant. In general, the intersection point between the plane P and the inner wall of the chamber or piston 12 can be displaced, for example towards the chute, by leaving the angle α constant and decreasing h1 (by translating the chamber upwards), or else by leaving h1 constant and decreasing α (by the chute rotation).

Referring to FIGS. 4A-4C, in the shown embodiment, a decrease of h1 involves automatically a decrease of a and similarly an increase of h1 corresponds to an increase of the α angle; then it is possible to rapidly obtain a displacement of the intersection point between the plane P and the inner wall of the chamber or piston 12 by means of a little and accurate rotation of the stepper motor corresponding to a change of h1 and then of α.

Analogously to h2, an a angle can be determined too by appropriate position sensors known in the art or obtained from the h1 distance.

As afore mentioned, an ideal shape of uniform distribution is that in which the highest point (top) of the cone, made of coffee fed into the chamber, lies on the axis 4 or immediately adjacent thereto. Based on this visual observation, or other observations that can be visual or not, such as for example a coffee layer with a substantially constant thickness, and/or the dispensing beverage times, and/or the organoleptic characteristics of the dispensed coffee (that is the final beverage), it is possible to proceed with the construction of "maps" in which the preferred coordinates requested for every measure of coffee are stored, so as to have the requested distribution of powdered coffee into the infusion chamber.

This allows the use of an infusion chamber with relatively great dimensions also with very reduced amounts of powdered coffee, without losing the quality of the dispensed beverage.

Then, during the map construction, the coordinates h1, h2 and α are stored with which a determined distribution of powdered coffee settled in the infusion chamber is repeatably obtained; the particular embodiment shown in figures allows to determine and adjust h2 and α through h1, thereby embodiments are provided in which the realized maps are easier and in which only the coordinate h1 of the position, or of a series of positions (coordinates h1) that the infusion chamber has to reach for every coffee amount and then for every beverage selected by an user, is stored; in this embodiment the values assumed by a based on h1 and at least the value of h2 at the beginning of the cycle, are anyway known.

In practice, during the map construction, it is possible to determine the experimentally obtained h1, h2 and α values and to store them into the map; or else it is possible to detect only the h1 values and determine the h2 and α values, by drawing them from h1, then store such coordinates into the map; or else to detect and store the h1 coordinates only, that is all positions the infusion chamber will have to adopt during the whole cycle for preparing the particular beverage selected by the user, starting from a known value of h2 at the beginning of the cycle.

Referring to FIGS. 2-8; the beverage preparation steps are now described.

At the beginning a user of a machine comprising an apparatus 1 according to the present invention, selects the dispensation of a coffee type through known methods. The control unit 21 monitors in a known way (for example by means of position sensors, encoders on the worm 5 or similar devices) the coordinates h1, h2 and α of the chamber 3 of the piston 12 and chute 6.

Then, before feeding by gravity the selected measure of ground coffee into the infusion chamber 3, the control unit 21 selects, from the stored map, the coordinates h1, h2 and α the infusion apparatus will have to reach during the whole operating cycle.

At the beginning the control unit acts on the motor M1 of the apparatus 1 to adapt the volume of the infusion chamber (height h2) to the selected typology of coffee selected by the user.

As mentioned before, the adjustment of h2 can be carried out in a number of modes, for example through appropriate motors. In the exemplary implementation shown in figures, usually the adjustment of h2 is carried out starting from an initial configuration of chamber 3 that is the one shown in FIG. 7. As a matter of fact, this is the position the chamber assumes at least during the ejecting step of the exhausted tablet of coffee; the lower piston 12 of the infusion chamber 3 is raised substantially flush with the upper edge 15 of the infusion chamber 3 and the column 12' of the piston is in abutment against the lower base 17 of the frame 2.

In this reference position, h1 corresponds to a coordinate h2 equal to zero because the lower piston 12 is flush with an upper edge 15 of the chamber 3; referring to FIG. 2, in order to adjust the volume of the infusion chamber, the chamber is translated until the upper piston 14 is in contact with the lower piston 12 and has been pushed inside the chamber; the chamber is translated up to reach a position h1 that can be present in the memory or anyway calculated from the value of the desired coordinate h2.

Such a final position is reached through a closed loop control carried out by the control logic that monitors, in such a way, the h1 position of the chamber and drives the motor means M1 until h1 will reach the value stored in the map. The position h1 of the chamber is detected by means of position sensors, encoders on the worm 5 or similar devices.

Alternatively, the adjustment of h2 is carried out starting from an initial configuration of chamber 3 that is the one shown in FIG. 9. In this configuration the chamber is completely raised and the lower piston 12 of the infusion chamber 3 is completely lowered; in this starting configuration, the coordinate h1 and the coordinate h2 are known (equal to their minimum and maximum value, respectively). Referring to FIG. 9, in order to adjust the height h2, the chamber is lowered so that the column 12' of the lower piston 12 abuts against the lower base 17 of the frame 2 and the lower piston 12 reaches the desired height h2; for this purpose the chamber is lowered up to reach a position h1 that can be present in the memory or anyway calculated from the desired value h2. Such a final position h1 is reached by a closed loop control similar to that described before.

Once the volume has been set up, the infusion chamber 3 is then translated to reach an addition position h1 stored in the map; in such a configuration, the chamber is positioned underneath the feed chute 6 and thanks to the mutual engagement of the cam surfaces 9 and 10, such a position h1 corresponds to a desired angle $\alpha$ of the feed chute 6; in fact, as afore mentioned, every $\alpha$ value obtained during the map construction corresponds to a stored value h1.

Figure 5:
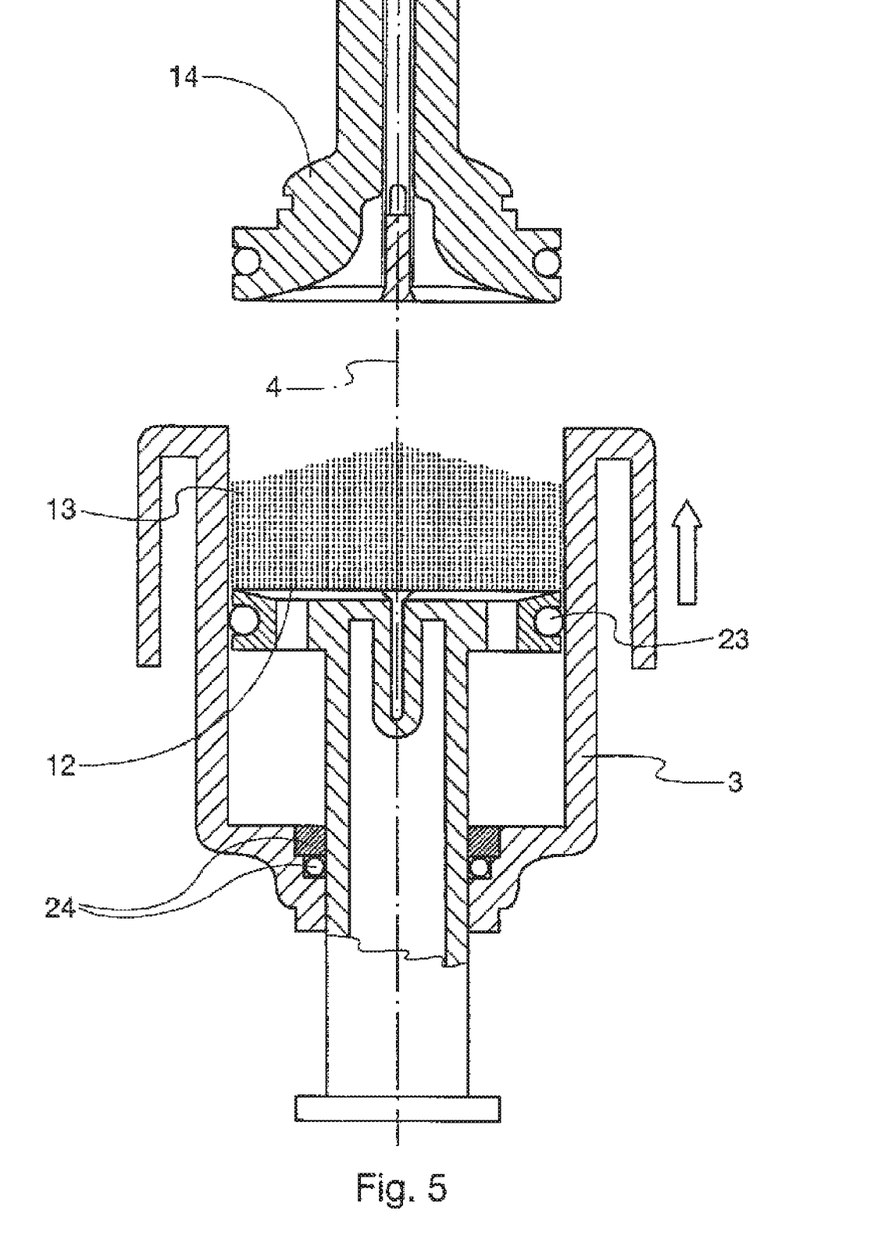
FIGS. 5 and 6 are partial cross sections of the apparatus during the step of compressing the ground coffee.

Then, when this h1 value and consequently a determined angle $\alpha$ will be reached, as illustrated in the sequence of FIGS. 4A-4C, it is possible to feed the ground coffee, as schematized in FIG. 5. Thanks to the optimal positioning between the infusion chamber 3 and the chute 6, a distribution as homogeneous as possible of ground coffee inside the chamber 3 is obtained.

In the memory map is anyway provided the possibility of having additional a angles (then additional h1 positions) the chamber will have to reach in determined time ranges during the feeding of ground coffee. In other words, during the feeding of ground coffee into the chamber, usually happening during the grinding of coffee beans, the control logic can drive the motor means M1 and change the angle $\alpha$ based on additional h1 values present in the stored map; to reach such stored coordinates, the control unit can stop the grinding during the chamber translation, or else translate the chamber during the grinding and then the coffee powder settlement.

Figure 6:
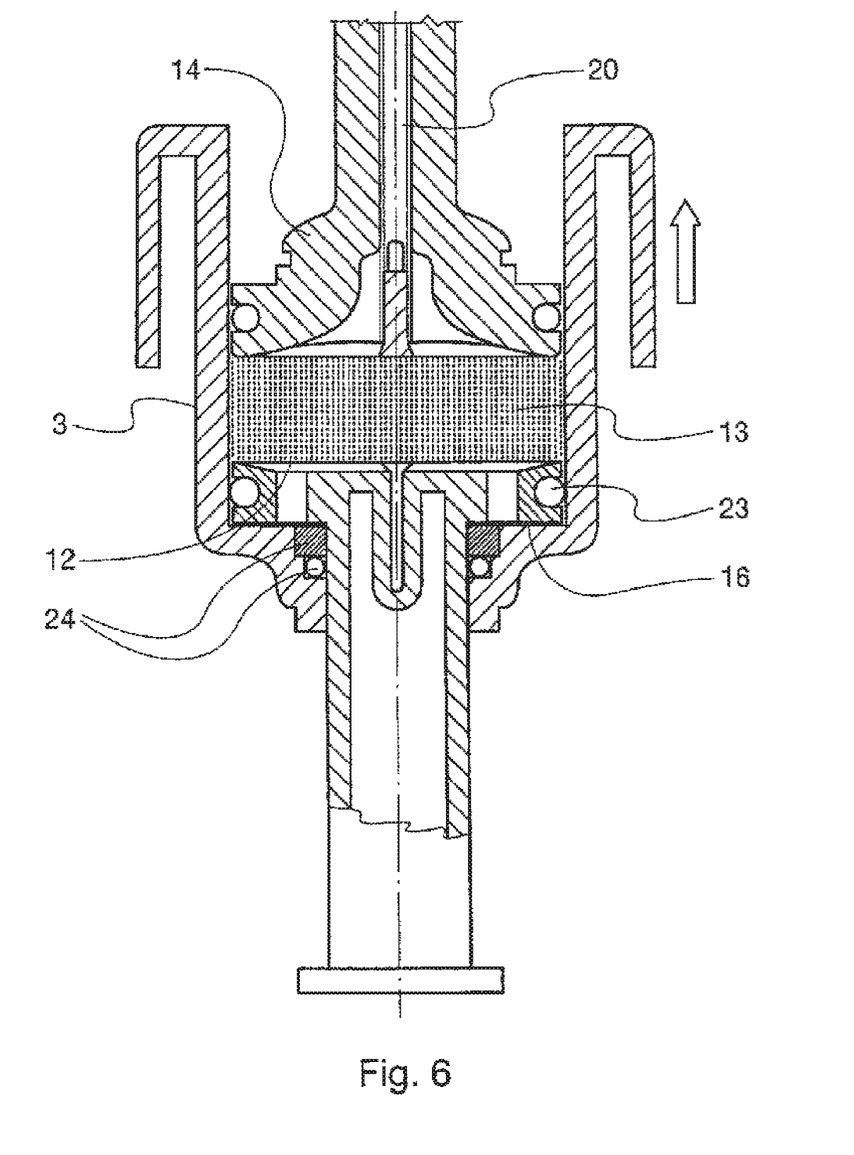

When the feeding step is ended, the infusion chamber 3 is then raised again towards the piston 14, as shown in FIG. 6, to compress the ground coffee and form the so-called "tablet" 13. The lower piston 12 is then pushed by the piston 14 until it stops next to the lower edge 16 of the infusion chamber 3, position in which the piston 14 applies the pressure necessary to compact the ground coffee and form the tablet 13.

In the shown position of FIG. 6, the beverage infusion happens, that is the feed of water into the infusion chamber 3 through a radial inlet duct (not shown) communicating with the lower part of the infusion chamber 3. Then the infusion liquid passes through the infusion chamber 3 so that to extract the substances from the tablet 13 of ground and presses coffee. An outlet duct 20 allows the beverage to be dispensed to the user.

Figure 7:
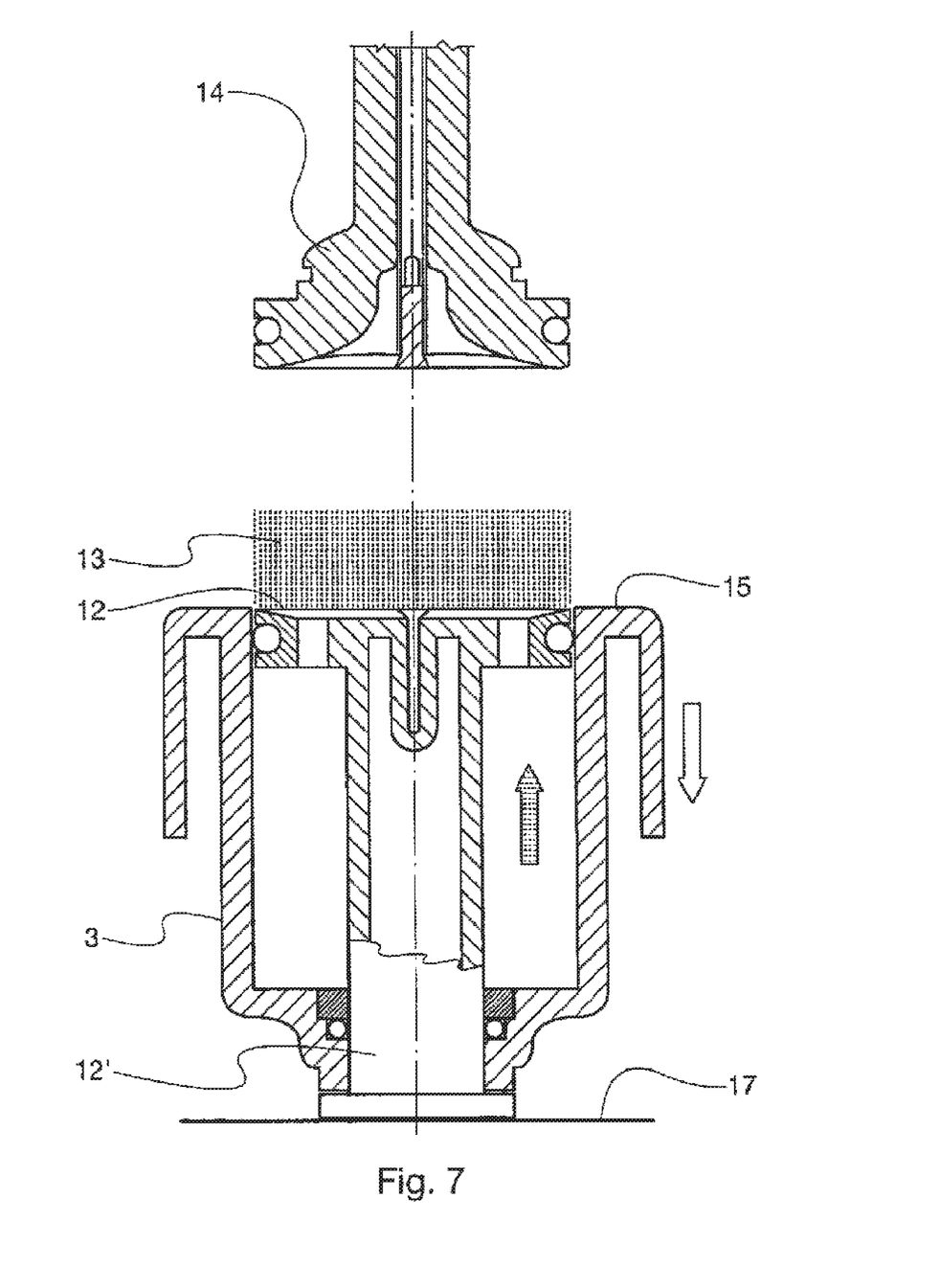
FIGS. 7 and 8 are partial cross sections of the apparatus during the step of ejecting the tablet of ground coffee after the infusion.
Figure 8:
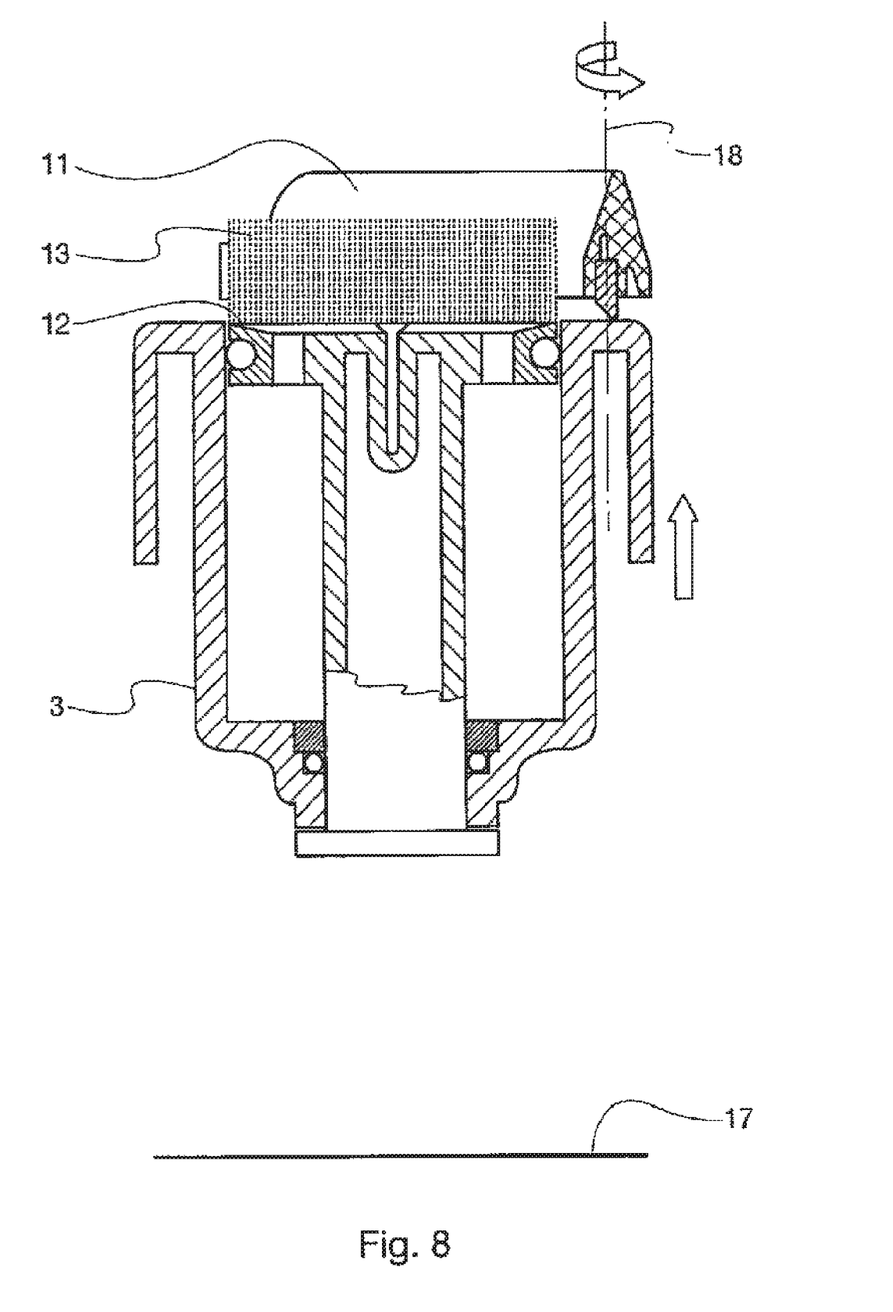

In FIGS. 7 and 8, the operations for the removal of the exhausted table 13 are shown. The infusion chamber 3 is moved away from the piston 14 towards its own position A of FIG. 10 with h2 equal to zero, as shown in FIG. 2. In particular, the infusion chamber 3 is completely lowered, so that the column 12' of the lower piston 12 will abuts against the lower base 17 of the frame 2, thereby moving the lower piston 12 at the upper edge 15 of the infusion chamber 3, as shown in FIG. 7 (h2 equal to zero).

Figure 10:
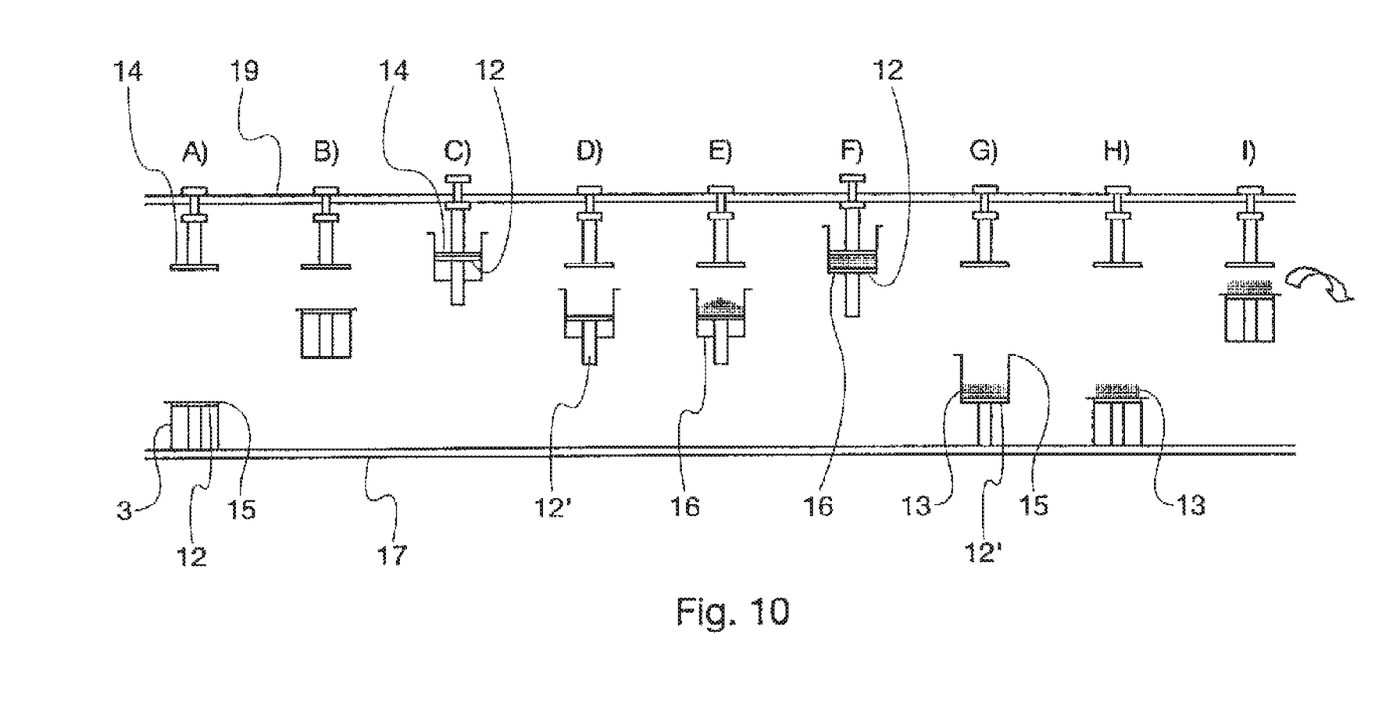
FIGS. 10 and 11 show the positions of chamber and pistons during a cycle for preparing the beverage, starting from two different initial positions of the chamber.
Figure 11:
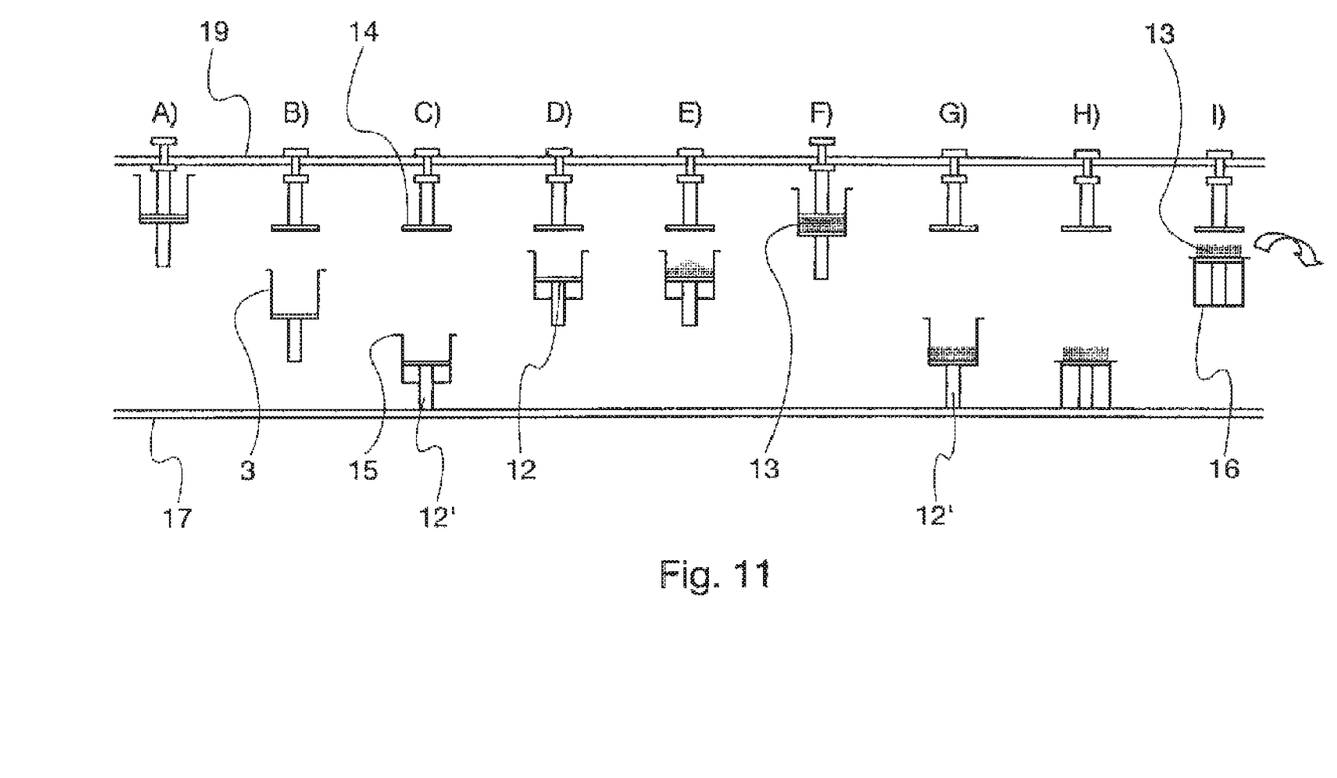

Afterwards, as illustrated in FIG. 8, the chamber 3 is translated upwards up to reach the discharge position shown in FIG. 8 (position i of FIGS. 10, 11). Once this position is reached, the ejecting means remove the tablet 13. In the herein described embodiment, the ejecting means are composed of a paddle 11 rotatable around an axis 18 to remove, because of its rotation, the tablet 13 from the lower piston 12 in a raised position. Once the tablet 13 has been removed, the initial condition is created again and a new preparing and dispensing cycle of coffee can start.

In FIGS. 10 and 11 a dispensing cycle of the beverage, showing the position that chamber and piston can assume one with respect to another, is shown. The cycle of FIG. 10 starts from an initial position in which chamber and piston are in their lower positions, the cycle of FIG. 11 starts from a position in which chamber and piston are in their upper position (similarly to FIG. 9).

For illustrative and non-limitative purposes, values of coordinates h1, h2 and $\alpha$ will follow, obtained during experimental tests, that optimize the coffee distribution in an infusion chamber having a diameter equal to 45 mm.

Measure 4 grams: h1=106 mm, h2=36 mm; $\alpha$=27°;
Measure 8 grams: h1=109.5 mm, h2=42 mm; $\alpha$=27°;
Measure 14 grams:
h1=104.5 mm, h2=44 mm; $\alpha$=26.2° (for the first 6 seconds);
h1=109.5 mm, h2=44 mm; $\alpha$=27° (for the following 4 seconds).

What is claimed is:

1. A process for preparing coffee or other beverage by infusion of a material in a dispensing apparatus (1) having a supporting frame (2), a cylindrical infusion chamber (3), with a substantially vertical axis (4), said chamber (3) being mounted on said supporting frame (2) and able to move in translation with respect to said frame (2) along a direction parallel to the axis (4) of the infusion chamber (3), a lower piston (12) forming a bottom wall in said chamber (3), said wall being movable in said infusion chamber (3), a feed chute (6) mounted on said supporting frame (2) which is able to rotate with respect to said frame in order to feed ground coffee to said infusion chamber (3), a higher piston (14) for closing said infusion chamber during the beverage infusion step and a control unit for managing said process, said control unit being provided, or connected, with a memory (22) which stores values of coordinates of said chamber, lower piston and chute positions, said process comprising the following steps at least one of which is performed by the control unit:
identifying the beverage type selected by the user,
determining the positions of said chamber (3), said lower piston (12) and chute (6),
checking whether said positions correspond to those stored in said memory (22) and associated with the beverage to be dispensed;

in case, changing the position of the chamber (3), the position of the chute (6) and the position of the lower piston (12) up said chamber (3), said chute (6) and said lower piston (12) reach the corresponding stored positions for the selected beverage, wherein the movable infusion chamber (3) and/or the feed chute (6) during the feeding of ground coffee to said infusion chamber (3) are arranged, one with respect to another, as a function of the amount of ground coffee of the measure to be accommodated inside the infusion chamber (3);

feeding ground coffee to said infusion chamber (3);

feeding water into the infusion chamber (3) to extract substances from the ground coffee and prepare the beverage to be dispensed; and dispensing the requested beverage.

2. The process according to claim 1, further comprising the step of determining said chamber, lower piston and chute positions through at least one of the values of the coordinates α, h1 and h2, where α is the tilt angle of the chute (6) with respect to said chamber axis (4), h1 is the distance of the chamber (3) from the upper base (19) of said frame (2) and h2 is the distance of said lower piston (12) from the upper wall (15) of said infusion chamber (3).

3. The process according to claim 1, further comprising the step of experimentally determining the values of α, h1 and h2, where α is the tilt angle of the chute (6) with respect to said chamber axis (4), h1 is the distance of the chamber (3) from the upper base (19) of said frame (2) and h2 is the distance of said lower piston (12) from the upper wall (15) of said infusion chamber (3), said values corresponding, for a determined coffee amount, to a chamber position in which the requested distribution of ground coffee into said chamber (3) is obtained, and the step of storing said values in said memory (22) as values adapted for the beverage/s corresponding to said amount of ground coffee.

4. The process according to claim 1, wherein said positions are changed during the step of dispensing coffee into said infusion chamber.

5. The process according to claim 1, wherein said feed chute (6) is rotated with respect to an axis (4) perpendicular to the translation axis of said infusion chamber in order to adjust the position thereof.

6. The process according to claim 1, wherein the rotation of said chute (6) is adjusted by means of respective cam surfaces (9, 10) associated with said chute (6) and said infusion chamber (3) or with means (11) for ejecting of a coffee tablet (13) after the infusion.

7. The process according to claim 1, wherein positions leading to a cone of powdered coffee, at the end of the step of dispensing ground coffee into said infusion chamber, are stored as positions associated with said beverage to be dispensed, where the top of said cone is arranged coaxially or adjacent to said axis (4) of the infusion chamber (3).

* * * * *